June 26, 1962 — H. B. CORSAW — 3,040,334
BALL VALVE GUIDE APPARATUS
Filed July 19, 1960
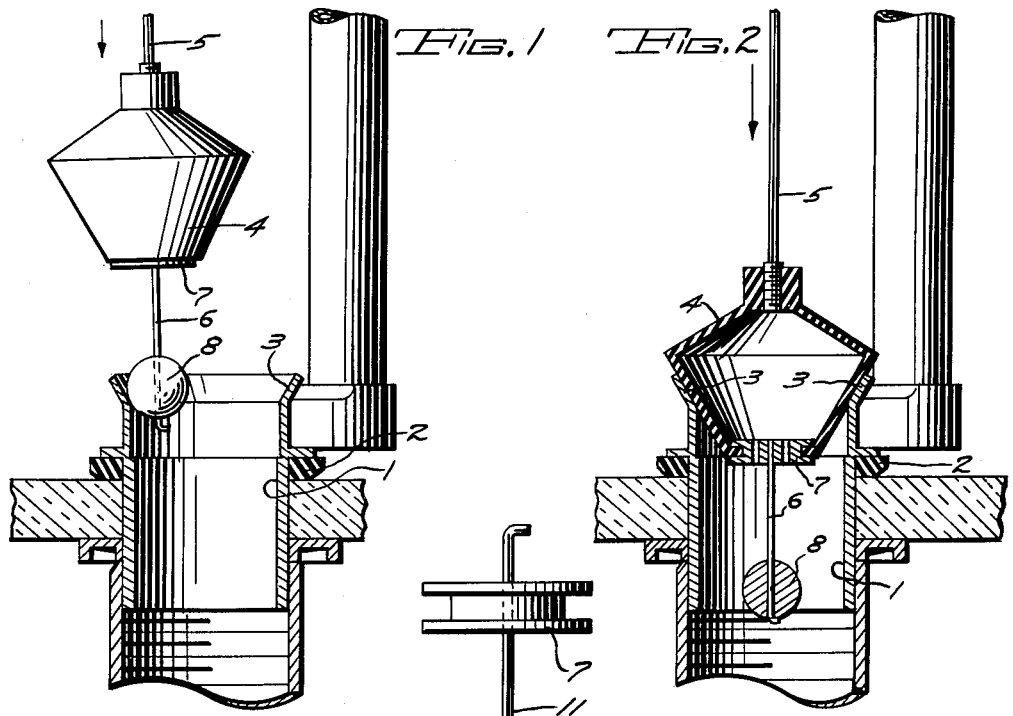
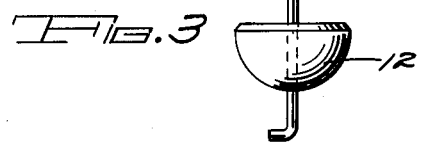
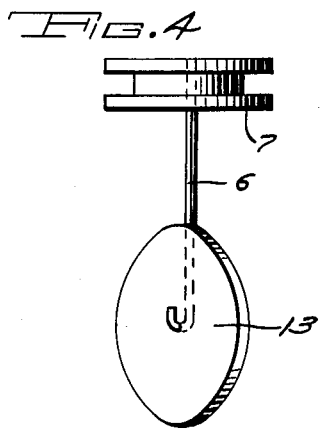
Inventor
Harry B. Corsaw
By Harry E. Aine
ATTORNEY United States Patent Office 3,040,334
Patented June 26, 1962

3,040,334
BALL VALVE GUIDE APPARATUS
Harry B. Corsaw, 4159 El Camino Way, Palo Alto, Calif.
Filed July 19, 1960, Ser. No. 43,917
14 Claims. (Cl. 4—57)

The present invention relates in general to ball valves and more particularly to a novel ball valve guide apparatus which is especially useful in toilet flush tanks for assuring proper seating of the flush valve thereby eliminating undesired water waste and attendant annoying noises.

The present invention relates to an improvement in ball valve guide apparatus of the type as shown and described in my prior copending U.S. application, Serial No. 9,305, filed February 17, 1960. In that application there is taught an extremely inexpensive and simple ball valve guide device which is resiliently affixed to the ball valve and depends therefrom downwardly into the water discharge pipe to provide positive guidance throughout substantially the entire rectilinear translation of the ball valve whereby positive seating of the ball in the valve seat is always assured. The aforementioned dependent guide device typically takes the form of any one or more of the following: a wire loop, quadraturely disposed wire loops, diamond shaped vanes, or a ball. With such aforementioned guide devices, it has been found that, in certain water discharge pipes, there may be found certain obstructions and deformities in the side wall of the discharge pipe which serve to cause such guide device to be hung thereon thereby preventing proper seating of the ball in the valve seat.

The present invention provides an extremely inexpensive and simple ball valve guide apparatus which is resiliently affixed to the ball valve and depends therefrom downwardly into the water discharge pipe and which device at its contacting surface with the discharge pipe permits relative movement between such contacting surface and the ball valve such relative movement either causing the contacting guide device to remain stationary as to further downward movement while allowing the ball valve to slide downwardly therethrough or such movement allowing the guide to ride over such obstructions in the discharge pipe.

The principal object of the present invention is to provide an extremely simple and inexpensive flush tank ball valve guide apparatus whereby proper seating of the ball valve in the valve seat is always assured.

One feature of the present invention is the provision of a lower ball valve guide member resiliently coupled to the ball valve and depending therefrom downwardly into the water discharge pipe, said guide member shaped like a vane, ball, wheel, hemisphere, or the like for catching the discharging water to impart a rapid oscillatory motion via the resilient coupling to the ball valve to assure proper seating of the ball valve in the valve seat. Said guide member also being affixed to said ball valve in a manner such as to allow relative movement between the discharge pipe contacting surface of said guide member and said ball valve, as by being slideably connected thereto or rotationally connected thereto for readily allowing said ball valve to drop into the valve seat without being hung up on obstructions in the water discharge pipe.

Another feature of the present invention is the provision of a lower ball valve guide member resiliently coupled to the ball valve and depending downwardly therefrom into the water discharge pipe, said lower guide member including a ball freely slideable upon a rod which in turn is resiliently coupled to the ball valve.

Another feature of the present invention is the provision of a lower ball valve guide member resiliently coupled to the ball valve and depending downwardly therefrom into the water discharge pipe, said resilient coupling of the guide member to the ball valve being effected through the intermediary of a rod, said rod and said lower guide member being freely slideable with respect to said ball valve whereby in use if the lower ball valve guide encounters an obstruction in the water discharge pipe, the rod may retract into the ball and the guide member may retract up against said ball to facilitate seating of said ball valve in the valve seat.

Another feature of the present invention is the provision of a lower ball valve guide member resiliently coupled to the ball valve and adapted to depend downwardly therefrom into the water discharge pipe, said lower guide member including a wheel adapted for rolling contact with the inside surface of the water discharge pipe whereby said wheel serves to guide the ball valve into the valve seat and further allows said guide member to roll over imperfections and projections on the side of the water discharge pipe which might otherwise tend to hang up the ball valve.

Other features and advantages of the present invention will become apparent upon a perusal of the specification taken in connection with the accompanying drawings wherein:

FIG. 1 is a side elevational view partly in cross section depicting a toilet flush valve assembly utilizing features of the present invention, FIG. 2 is a side elevational view partly in cross section depicting the toilet flush valve assembly of FIG. 1 in the closed position, FIG. 3 is an enlarged side elevational view of a lower ball valve guide assembly employing alternative features to the structure depicted in FIGS. 1 and 2, FIG. 4 is a side elevational view of a lower ball valve guide apparatus employing alternative features of the present invention.

Referring now to FIGURES 1 and 2 there is shown one embodiment of a toilet flush valve assembly employing features of the present invention. More particularly, FIG. 1 depicts the flush valve assembly in the open position and FIG. 2 depicts the same valve assembly in the closed position. A discharge pipe 1 is sealed at the bottom of a flush tank, not fully shown, via a suitable rubber gasket 2. The discharge pipe 1 is provided with a flared entrance at the upper end thereof forming a frusto-conical valve seat 3. The discharge pipe 1 is selectively sealed off at its upper end via the intermediary of the conventional movable hollow ball valve 4 as of, for example, rubber for seating in the valve seat 3.

A valve stem 5 as of, for example, 3/32" diameter brass wire is connected to the ball valve 4 and is sealed thereto as by, for example, being threaded into a suitable insert, not shown, vulcanized to the ball 4. The upper portion of the valve stem 5, not shown, is adapted and arranged to be operatively connected to the flush lever, not shown, for raising the ball valve 4 as desired to thereby open the flush valve assembly. A suitable stop, not shown, is provided to prevent excessive upward travel of the ball valve 4.

A lower ball valve guide assembly includes a rod 6 resiliently affixed to the ball valve 4 via the intermediary of a peripherally recessed perforated disk 7. The peripherally recessed disk 7 has an axial bore therein to receive therethrough the rod 6, the rod being fixedly secured to the disk 7. The disk 7 is resiliently coupled to the ball valve 4 by capturing, within its peripheral recess, the margins of the opening in the bottom of the conventional hollow ball valve 4. A ball 8 is slideably captured upon the rod 6, as by being strung on the rod 6, the rod passing through a suitable bore centrally disposed of the ball 8 and the ball 8 freely slides on the rod 6 axially of the rod 6. The ball 8 is preferably made of a suitable lightweight material, such as polystyrene, formed with a smooth hard exterior surface.

In operation, upward movement of the flush valve lever, not shown, causes the valve stem 5 to raise the ball 4 from the valve seat 3. The ball valve 4, when free of the seat 3, floats to its uppermost extent of travel as determined by the stop, not shown. In the uppermost extent of travel the lower ball valve guide assembly including the ball guide 8 is retained within the discharge pipe 1 to assure sufficient guidance for the ball valve 4 such that when the ball 4 drops into the valve seat 3, with the receding water, the ball 4 will not be caught and improperly lodged upon the valve seat 3. As the receding ball valve 4 approaches the valve seat 3 the discharging water, in discharge pipe 1, due to its whirlpool action causes the lower ball guide 8 to be subjected to a rapid oscillatory and combined centering action which action is imparted to the ball valve 4 through the intermediary of the resiliently connected rod 6. In this manner, the ball 4 is jiggled into a centered positive seat within the valve seat 3.

In case the lower ball guide 8 should hang up on an obstruction on the inside surface of the discharge pipe 1, the ball valve 4 is not thereby restrained. Instead, because of the slideable connection between the rod 6 and the ball guide 8, the ball valve 4 recedes with the water, guided by the ball guide 8, the rod 6 freely sliding through the lodged ball guide 8 and allowing the ball valve 4 to drop into a proper seating relationship with the valve seat 3.

Referring now to FIG. 3 there is shown an alternative lower ball valve guide assembly employing alternative features of the present invention. More specifically, the peripherally recessed disk 7 is not fixedly secured to a lower guide rod 11, as in the previous embodiment, but instead the rod 11 is freely slideable along the axis of revolution of the disk 7. A lower ball valve guide member 12, preferably shaped in the form of a hemisphere, is axially bored and strung on the rod 11 in freely axially slideable engagement therewith. The ends of the rod 11 are crimped over to thereby capture both the disk 7 and the hemisphere guide member 12 on the rod 11.

In operation, the lower ball valve guide assembly of FIG. 3 operates in a similar manner as that depicted in FIGS. 1 and 2 with the exception that a substantial portion of the rod 11 will retract into the hollow ball valve 4. In addition, the hemisphere shape of the lower guide member 12 allows the guide 12 to retract to a substantial extent against disk 7 and thereby minimize the length of the lower ball valve guide assembly depending from the disk 7 when in the fully retracted state. This feature is especially desirable in certain flush valve assemblies wherein a substantial obstruction in the discharge pipe 1 as, for example, a cross bar is provided closely spaced to the valve seat 3. In such installations, the above described retractable features of the lower ball valve guide assembly allows such a ball valve guide to properly function since as the ball valve 4 drops into position if the rod 11 and lower guide member 12 are stopped on the aforementioned obstruction, the ball valve 4 may readily drop into a seated position in the valve seat 3 by allowing the rod 11 and the lower guide member 12 to respectively retract into and against the ball valve 4 and disk 7.

Referring now to FIG. 4 there is shown an alternative lower ball valve guide assembly similar to that depicted in FIGS. 1 and 2 with the exception that the lower ball valve guide member 13 is shaped in the form of a wheel freely rotatable at the end of the rod 6.

In operation, the lower ball valve guide wheel 13 serves to jiggle the ball 4 into a proper seat in the valve seat 3. If obstructions in the discharge pipe 1 are encountered by the wheel 13, the wheel 13 will readily roll over such obstructions thereby preventing a hang up of the ball valve 4 during its descent into the valve seat 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A ball valve guide apparatus including, a guide member adapted to depend downwardly from the ball valve into a water discharge passageway for contact with the side walls of the passageway for guiding the ball valve into a valve seat, means for resiliently coupling said guide member to the ball valve for transmitting guiding forces exerted on said guide member to the ball valve, and means for providing substantial relative movement between the ball valve and the discharge passageway contacting portion of said guide member whereby the ball valve is prevented from hanging up on obstructions in said discharge passageway.

2. A ball valve guide apparatus for flush tanks including, a guide member adapted to depend downwardly from the ball valve into a water discharge passageway for contact with the side walls thereof for guiding the ball valve into a valve seat, means for resiliently coupling said guide member to the ball valve for transmitting guiding forces exerted on said guide member to the ball valve, and means for providing substantial slideable movement between the ball valve and said guide member whereby the ball valve is prevented from being hung up on obstructions in the water discharge passageway via the intermediary of said guide member.

3. The apparatus according to claim 2 wherein said resilient coupling means includes, a rod, said guide member being freely slideable upon said rod.

4. The apparatus according to claim 3 wherein said guide member is shaped in the form of a ball, said ball being strung on said rod.

5. The apparatus according to claim 3 wherein both guide member and said rod are freely slideable with respect to the ball valve.

6. The apparatus according to claim 5 wherein said slideably mounted guide member is formed in the shape of a hemisphere to facilitate retraction toward the ball valve.

7. A ball valve guide apparatus for flush tanks including, a peripherally recessed perforated disk adapted to be resiliently coupled to the ball valve by capturing the margins of a hole in the hollow ball valve within the peripheral recess of said disk, a rod carried from said disk and downwardly depending therefrom for extending into the water discharge passageway, a guide member mounted on said rod in freely slideable relationship therewith and adapted to engage the inside walls of the water discharge passageway of the flush tank with which the ball valve is associated, as the ball valve descends, for guiding the ball valve to its seat.

8. The apparatus according to claim 7 wherein said guide member is substantially of spherical shape.

9. The apparatus according to claim 7 wherein said rod is freely slideable with respect to said disk, and said guide member is substantially of hemispherical shape the substantially flat side of said hemispherically shaped guide member being positioned adjacent said disk for facilitating retraction of said guide member against the ball valve.

10. A ball valve guide apparatus for flush tanks including, a guide wheel adapted to depend downwardly from the ball valve into a water discharge passageway for contact with the inside walls of the discharge passageway for guiding the ball valve to a valve seat, means for resiliently coupling said guide wheel to said ball valve for transmitting guiding forces exerted on said guide wheel to the ball valve, and said guide wheel serving to roll over obstructions in the side wall of said discharge passageway whereby the ball valve is prevented from hanging up on obstructions in the passageway.

11. The apparatus according to claim 10 wherein said means for resiliently coupling said guide wheel to the ball valve includes, a rod, said guide wheel being freely rotatable about said rod.

12. The apparatus according to claim 11 wherein said means for resiliently coupling said guide member to the ball valve includes, a peripherally recessed perforated disk, the peripheral recess in said disk serving to capture therein the margins of a hole in the bottom of the ball valve, and said rod being fixedly secured to said disk axially of said disk.

13. The apparatus according to claim 1 wherein the relative movement between said guide member and said ball valve is substantially in the direction toward the ball valve from the guide member.

14. The apparatus according to claim 2 wherein said slideable movement of said guide member is directed toward the ball valve.

References Cited in the file of this patent

UNITED STATES PATENTS

| | | |
|---|---|---|
| 2,139,862 | Shesler | Dec. 13, 1938 |
| 2,251,357 | Harroun | Aug. 5, 1941 |
| 2,495,616 | Vilandre et al. | Jan. 24, 1950 |
| 2,760,206 | Loyd | Aug. 28, 1956 |